US010773228B2

(12) United States Patent
Simon et al.

(10) Patent No.: US 10,773,228 B2
(45) Date of Patent: Sep. 15, 2020

(54) SELF-SEALING CONTAINER FOR PROTECTING AIR SENSITIVE SAMPLES

(71) Applicant: Massachusetts Institute of Technology, Cambridge, MA (US)

(72) Inventors: Kevin Patrick Simon, Somerville, MA (US); Lukas W. Porz, Boppard (DE)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/318,522

(22) PCT Filed: Jul. 18, 2017

(86) PCT No.: PCT/US2017/042519
§ 371 (c)(1),
(2) Date: Jan. 17, 2019

(87) PCT Pub. No.: WO2018/017534
PCT Pub. Date: Jan. 25, 2018

(65) Prior Publication Data
US 2019/0255496 A1    Aug. 22, 2019

Related U.S. Application Data

(60) Provisional application No. 62/363,507, filed on Jul. 18, 2016, provisional application No. 62/458,665, filed on Feb. 14, 2017.

(51) Int. Cl.
*B01J 3/03*      (2006.01)
*B65D 81/20*     (2006.01)
(Continued)

(52) U.S. Cl.
CPC .............. *B01J 3/03* (2013.01); *B65B 31/046* (2013.01); *B65D 81/2007* (2013.01);
(Continued)

(58) Field of Classification Search
CPC ........ B01J 3/03; B65B 31/046; B65B 31/047; B65B 31/048; B65D 51/1633;
(Continued)

(56) References Cited

U.S. PATENT DOCUMENTS 3,490,641 A * 1/1970 Beecher ..................... B01J 3/03
                                                    220/211
4,218,967 A * 8/1980 Batchelor .............. B65D 39/12
                                                    206/524.8
(Continued)

FOREIGN PATENT DOCUMENTS

WO    WO 2013/178218 A1    12/2013
WO    WO-2016137326 A1 *    9/2016    .............. B32B 27/08

OTHER PUBLICATIONS

Commissioner for Patents (ISA/US), International Search Report and Written Opinion for PCT Application No. PCT/US17/42519, dated Nov. 17, 2017 (20 pages).

*Primary Examiner* — Herbert K Roberts
(74) *Attorney, Agent, or Firm* — Sunstein LLP

(57) ABSTRACT

A self-sealing container, used for transferring one or more air sensitive samples between vacuum systems, includes a housing with a cavity that holds the sample(s), and a lid disposed on top of the housing. The lid is configured to interface with the housing to form a seal over the cavity when the lid is closed. At least two flexure systems, each coupled to the housing and the lid, are disposed on opposing sides of the housing. The flexure systems apply forces to the lid that move the lid horizontally and vertically above the housing, into an open position. A pneumatic actuator, movably coupled to the housing and the lid, that is actuated by a change in ambient pressure. When actuated, it applies forces that move the lid horizontally and vertically to the
(Continued)

closed position, in opposition to and in excess of the forces applied by the flexure systems.

21 Claims, 15 Drawing Sheets

(51) Int. Cl.
  *B65B 31/04* (2006.01)
  *B65D 51/16* (2006.01)
(52) U.S. Cl.
  CPC ...... *B65D 51/1672* (2013.01); *B65D 51/1683* (2013.01); *B65D 81/2015* (2013.01); *B65D 81/2069* (2013.01)
(58) Field of Classification Search
  CPC .............. B65D 51/1644; B65D 51/165; B65D 51/1672; B65D 51/1683; B65D 51/1688; B65D 51/1694; B65D 81/20; B65D 81/2007; B65D 81/2015; B65D 81/2023; B65D 81/203; B65D 81/2038; B65D 81/2046; B65D 81/2053; B65D 81/2061; B65D 81/2069; B65D 81/2076; B65D 81/2084; B65D 81/2092
  USPC ........ 206/524.8; 220/231, 316; 49/197, 198, 49/199, 200, 201, 202, 203, 204, 205, 49/206
  See application file for complete search history.

(56) References Cited

U.S. PATENT DOCUMENTS

| | | | | |
|---|---|---|---|---|
| 4,247,517 | A | * | 1/1981 | Sanderson ................ A61L 2/26 206/1.5 |
| 5,460,285 | A | * | 10/1995 | Harding, Sr. .......... B65D 90/34 220/203.01 |
| 5,779,082 | A | * | 7/1998 | Miramon .............. B65B 31/047 141/64 |
| 6,000,938 | A | | 12/1999 | Melanowicz |
| 2002/0134782 | A1 | * | 9/2002 | Heil .................... B65D 81/2038 220/212 |
| 2002/0194926 | A1 | | 12/2002 | Awtar et al. |
| 2003/0140824 | A1 | | 7/2003 | Poulsen |
| 2005/0244293 | A1 | * | 11/2005 | Lin .................... B65D 81/2038 417/510 |
| 2007/0095713 | A1 | * | 5/2007 | Schooley ........... B65D 81/2015 206/524.8 |
| 2008/0030851 | A1 | | 2/2008 | Rosenqvist |
| 2008/0131567 | A1 | * | 6/2008 | Lemme .................. F04B 33/00 426/418 |
| 2017/0225161 | A1 | * | 8/2017 | Begolo ............. B01L 3/502715 |
| 2019/0389634 | A1 | * | 12/2019 | O'Brien ............... B67D 3/0064 |

* cited by examiner

SELF-SEALING CONTAINER FOR PROTECTING AIR SENSITIVE SAMPLES

RELATED APPLICATIONS

The present application is a U.S. national stage entry under 35 U.S.C. § 371 of International Application No. PCT/US17/42519, filed Jul. 18, 2017, which claims priority to U.S. Application No. 62/363,507, entitled "Self-Sealing Sample Transfer Box" and filed Jul. 18, 2016 and U.S. Application No. 62/458,665, entitled "Self-Sealing Sample Transfer Box" and filed Feb. 14, 2017, which are hereby incorporated by reference in their entireties.

GOVERNMENT SUPPORT

This invention was made with Government support under Grant Nos. DE-AC02-05CH11231 and DE-SC0002633 awarded by the Department of Energy (DOE). The Government has certain rights in the invention.

TECHNICAL FIELD

The present invention relates to containers used to transport samples that are sensitive to air from one piece of equipment to another, and more particularly to containers that passively open and close in response to changes in pressure, without risk of damaging the samples or equipment.

BACKGROUND ART

Various fields, such as battery materials, semiconductor processing, and nano-materials, use materials that are sensitive to air. Exposure causes the material to degrade. For example, the surface of a sample of material may crack, and prolonged exposure to oxygen or water may destroy the sample altogether. Research on such materials often requires moving samples between pieces of equipment used to process and/or analyze the sample, such as glove boxes, scanning electron microscopes (SEM), focused ion beams (FIB) systems, and transmission electron microscopes (TEM). Limiting the samples' exposure to air during such transfer is crucial to successful experimentation, but equipment seldom includes airtight transfer systems.

Conventionally, a sample is first placed in a glove box, where it is inserted in a container. The container is then closed, inserted into a work chamber of a piece of equipment, and opened so that the equipment may analyze or process the sample. However, the manner in which existing containers open and close risk damaging the samples, equipment, or both, especially since sensitive components (e.g., sensors, ion guns) are often located within 10.0 mm of the focal plane of the equipment. Moreover, some equipment manufacturers may provide transfer systems, but they are seldom included with the equipment and tend to be costly.

One example, the Vacushut previously manufactured by Plano GmbH of Wetzlar, Germany, used a spring-loaded lid attached to a plastic bag. Inflating the bag lifts the lid, causing the lid to swing open by rotating more than ninety (90) degrees around a hinge. This range of motion could easily bring the lid in contact with sensitive components within equipment. Further, if the container malfunctions, the lid may open with more force than desired, causing greater damage. For FIBs, the sample stage rotates about two (2) orthogonal axes, and a loose, open lid moving in tandem risks further damage to the equipment. Moreover, when the bag is deflated, the spring closes the lid, but if the lid abruptly and forcefully closes (e.g., in response to the bag rupturing), the closure could shock and impact both the samples and the equipment. Other types of containers rely on self-rupturing membranes to close, which pose similar problems.

Moreover, many existing mechanisms for inserting samples into equipment are tailored to a particular type of equipment. For example, a transfer rod may be designed for inserting a sample into a TEM, but not a FIB. An airlock may be tailored for a SEM, but not a TEM. A container that opens or shuts using an infrared sensor can only be used with equipment that includes a viewing window. Therefore, to perform experiments, a researcher must purchase separate and costly tools for each type of equipment used during an experiment.

SUMMARY OF THE EMBODIMENTS

In accordance with one embodiment of the invention, a self-sealing container is used for transferring one or more air sensitive samples into and out of a vacuum system. The container includes a housing with a cavity configured to receive the one or more samples. The container also includes a lid disposed on top of the housing. The lid is configured to interface with the housing to form a seal capable of sealing the one or more samples in the cavity when the lid is in a closed position. The container also includes two or more flexure systems. Each flexure system is coupled to the housing and the lid. Furthermore, one of the flexure systems is disposed on one side of the housing and the other flexure system is disposed on an opposing side of the housing. The flexure systems are configured to apply forces to the lid that move the lid horizontally and vertically above the housing, into an open position. The container also includes a pneumatic actuator actuated by a change in ambient pressure. The pneumatic actuator is movably coupled to the housing and the lid. When the actuator is actuated, it is configured to apply forces that move the lid horizontally and vertically from the open position to the closed position, in opposition to and in excess of the forces applied by the flexure systems.

The pneumatic actuator may be positioned at an angle, such as ten (10) degrees, relative to the lid. Each flexure system includes at least two stages. In some embodiments, each flexure system is formed from a single piece of material, and in other embodiments, each stage comprises a strip of material coupled to one other stage in series. One end of a first stage may be attached to the housing and one end of a second stage may be attached to the lid. Each stage may include a strip of material comprising titanium, brass, a steel alloy, or combinations thereof.

In some embodiments, the pneumatic actuator is a double-acting cylinder having a piston movable within the cylinder. The cylinder is coupled to the housing and the piston is movably coupled to the lid. A valve may be in one end of the cylinder, and the valve may be configured to connect to a pump that actuates the piston by drawing air out of the one end to form a vacuum therein. The pneumatic actuator may be actuated when a difference in the pressure on one side of the piston compared to the pressure on the other side of the piston within the cylinder reaches a predetermined value. The cylinder may include coatings on surfaces of the cylinder and the piston that contact one another, which reduce friction between the two components. Alternative pneumatic actuators include bellows and expanding foam.

A flow resistor may be coupled to the pneumatic actuator and configured to affect a rate of change in the pressure within the pneumatic actuator in order to delay movement of the lid to the open position by the flexure systems. A square o-ring may be disposed around a perimeter of the cavity and configured to form the seal between the lid and the housing. Electrical contacts in electrical communication with the one or more samples may be disposed in the cavity.

In some embodiments, the container includes four flexure systems, each flexure system includes three (3) stages in series, two of the flexure systems are disposed on one side of the housing, and the other two flexure systems are disposed on an opposing side of the housing. In some embodiments, the housing includes aluminum and an inner surface of the cavity includes an anodized coating.

In accordance with another embodiment of the invention, a method is used for transferring an air-sensitive sample into and out of a vacuum system. The method includes providing a container having a cavity in a housing. The cavity is configured to receive the sample, and the housing has a lid disposed thereon and a piston assembly. The lid has an open position and a closed position. The lid is configured to seal the sample in the cavity when the lid is in the closed position. The lid is spring-biased in the open position and coupled to the piston assembly. The piston assembly is configured with a first side thereof coupled to ambient pressure and a second side thereof coupled to a valved port. The piston assembly includes a rod coupled to the lid and configured to move the lid to a closed position when net forces on both sides of the piston owing to pressure differences are sufficient to overcome the spring bias and to retain the lid in the closed position.

The method also includes placing the container in a glove box flooded with inert gas and with the valved port open, whereupon ambient pressure exists on the first and second sides of the piston so that the pressures are approximately equal and the spring-biased lid is in the open position. The method also includes placing the sample in the cavity. The method also includes coupling a pump to the valved port, running the pump to bring down pressure on the second side of the piston to a desired level of vacuum, and closing the valved port, so that the lid is retained in the closed position.

The method also includes moving the container into a chamber of the vacuum system. The method also includes evacuating the chamber of the vacuum system, whereupon the ambient pressure on the first side of the piston drops to match the vacuum pressure on the second side of the piston and the pressures are approximately equal and the spring-biased lid is in the open position, so that the sample can be analyzed by the vacuum system. The method also includes after analyzing the sample, flooding the chamber of the vacuum system with inert gas, whereupon ambient pressure on the first side of the piston is increased and the pressure difference between the first and second sides of the piston is again sufficient to overcome the spring bias and to retain the lid in the closed position. The method also includes removing the sample from the chamber of the vacuum system.

In accordance with another embodiment of the invention, a container includes a cavity in a housing. The cavity is configured to receive the sample. The housing has a lid disposed thereon and a piston assembly. The lid has an open position and a closed position, and is configured to seal the sample in the cavity when the lid is in the closed position. The lid is also spring-biased in the open position and is coupled to the piston assembly. The piston assembly is configured with a first side thereof coupled to ambient pressure and a second side thereof coupled to a valved port. The piston assembly includes a rod coupled to the lid and configured to move the lid to a closed position when net forces on both sides of the piston owing to pressure differences are sufficient to overcome the spring bias and to retain the lid in the closed position.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

A "flexure system" exerts a linear force on a body based on elastic deformation of its stages. A flexure system includes at least two stages.

A "stage of a flexure system" is a component, within a set of components that are connected in series, that is oriented in a different direction than its adjacent component(s). In some embodiments, each stage may be a unique metal blade, and in other embodiments, a stage may be a section of a single metal blade.

Because embodiments of the self-sealing container retain a low profile when opening and closing, the container may be used to transfer air sensitive samples into and out of vacuum systems used for imaging and/or processing samples without damaging the vacuum system equipment. The flexure systems and pneumatic actuator described herein open and close the lid by moving the lid in a large horizontal direction and a comparatively small vertical direction, determined by the relative angle between the lid and the pneumatic actuator. As a result, the lid remains at substantially the same angle relative to the container's housing in both its open and closed positions. Put another way, the position of the lid when the container is open is parallel to the position of the lid when the container is closed. Because the vertical movement of the lid is less than the difference between the focal or imaging length of the equipment and the lid, the lid remains below the imaging or processing equipment, even when the container is open. This feature minimizes the risk of contacting and damaging equipment when the container operates normally, or even malfunctions, is negligible.

Moreover, the pneumatic actuator enables the self-sealing container to passively open and close, i.e., without active direct contact or interference from a user or external system. Since the samples are being analyzed or processed in vacuum systems, at pressures such as $10^{-5}$ mBar, it is advantageous to have a container whose operation introduces fewer disturbances to the work environment. The pneumatic actuator, disposed at an angle relative to the lid, is actuated by a change in ambient pressure. The container remains closed when it is not in a vacuum system (e.g., at atmospheric pressure), but opens when it is in a vacuum system. Thus, the container may be opened or closed either by transfer to an environment with a different ambient pressure, or by changing the ambient pressure of its immediate environment. Because the container does not rely on direct user manipulation (e.g., user contact) or signals from external electrical control systems, whether wireless or wired, its operation is subject to less error and is less disruptive to the analysis or processing chamber of the vacuum system equipment.

Figure 1:
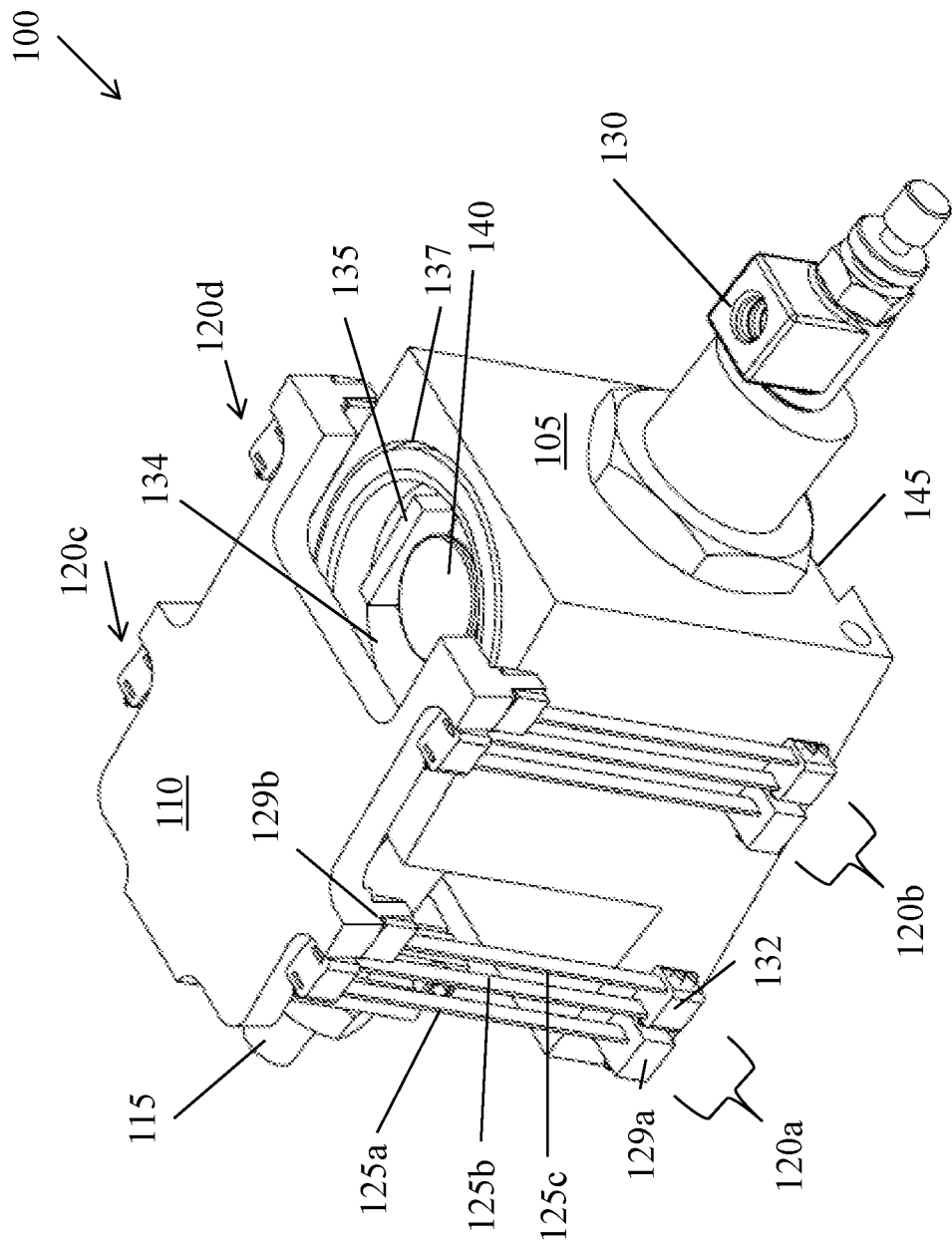
FIGS. 1-3 depict perspective, cross-sectional, and top views, respectively, of an exemplary self-sealing container in the open position according to embodiments of the present invention.
Figure 2:
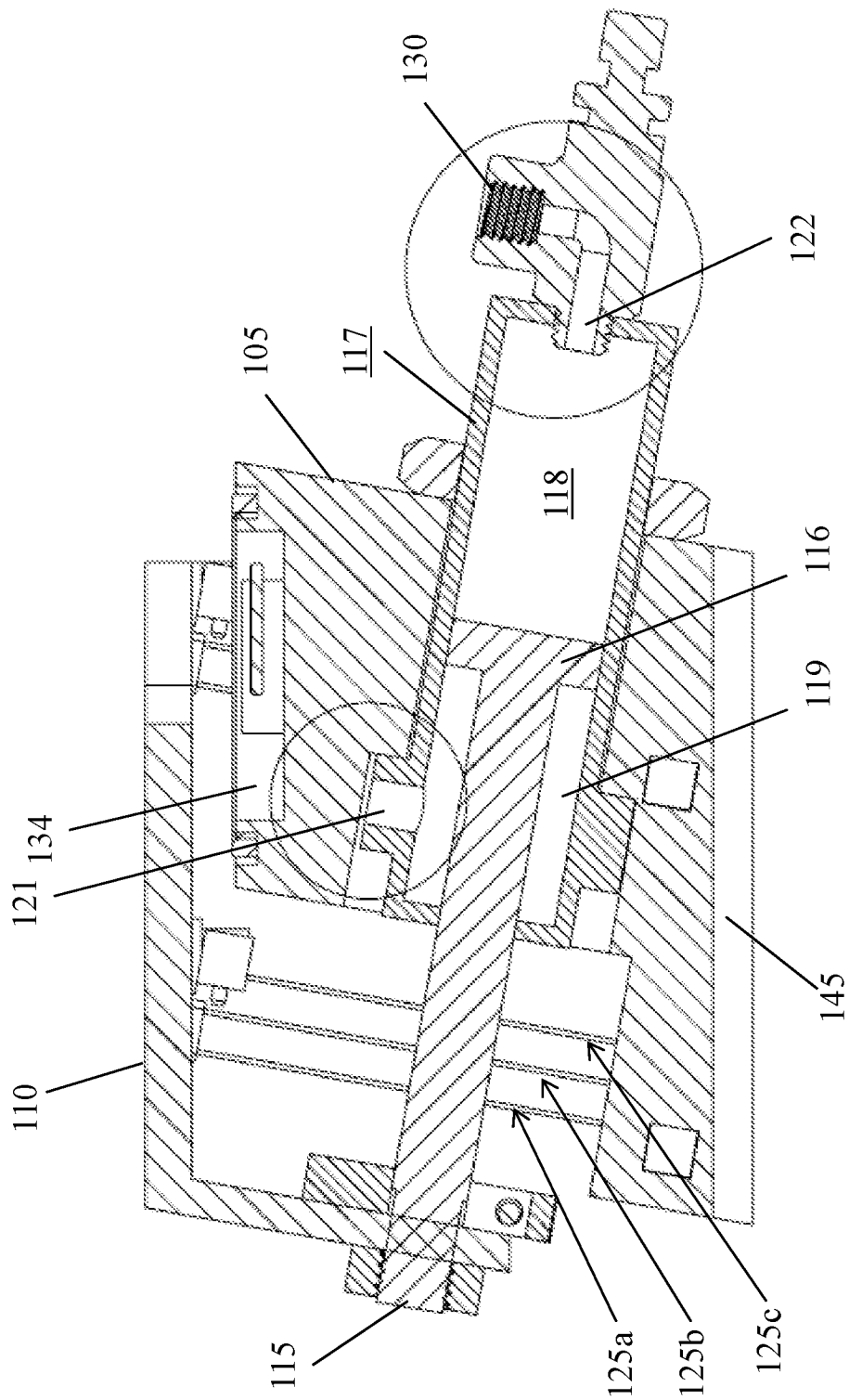
Figure 3:
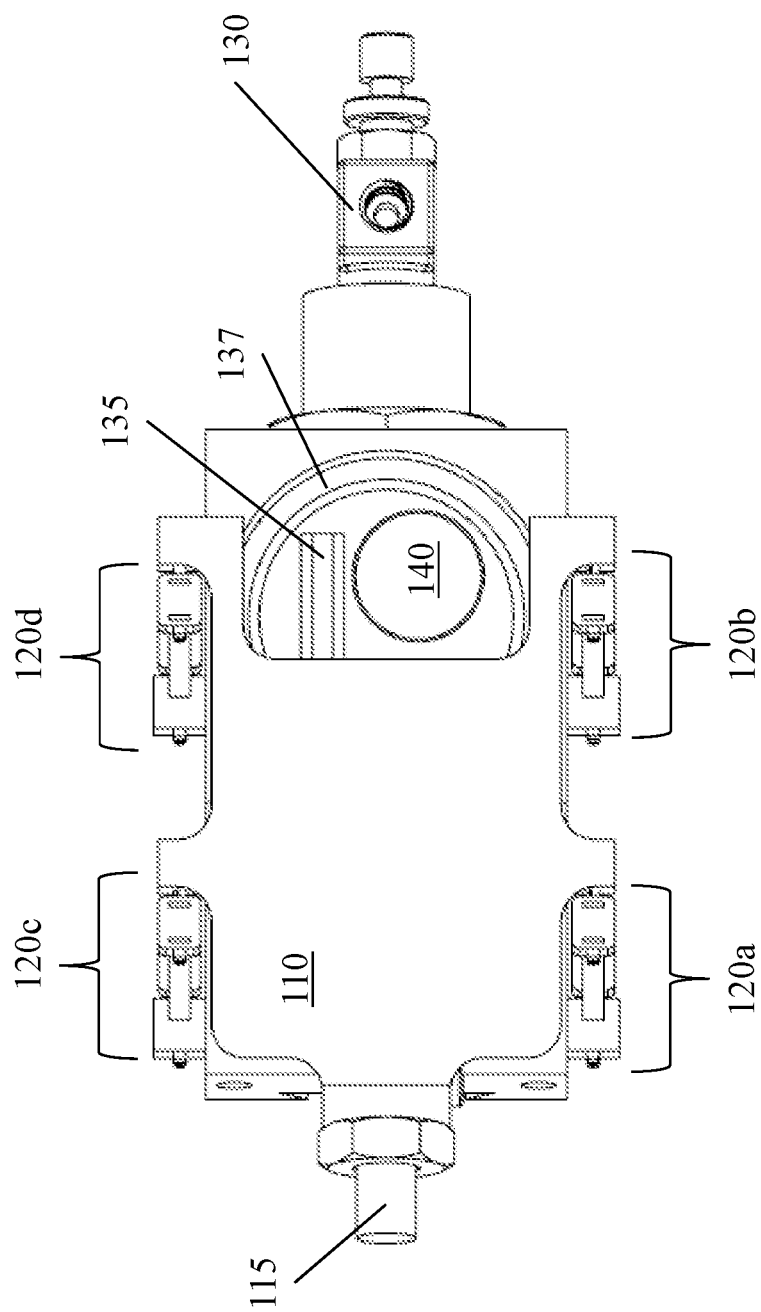
Figure 4:
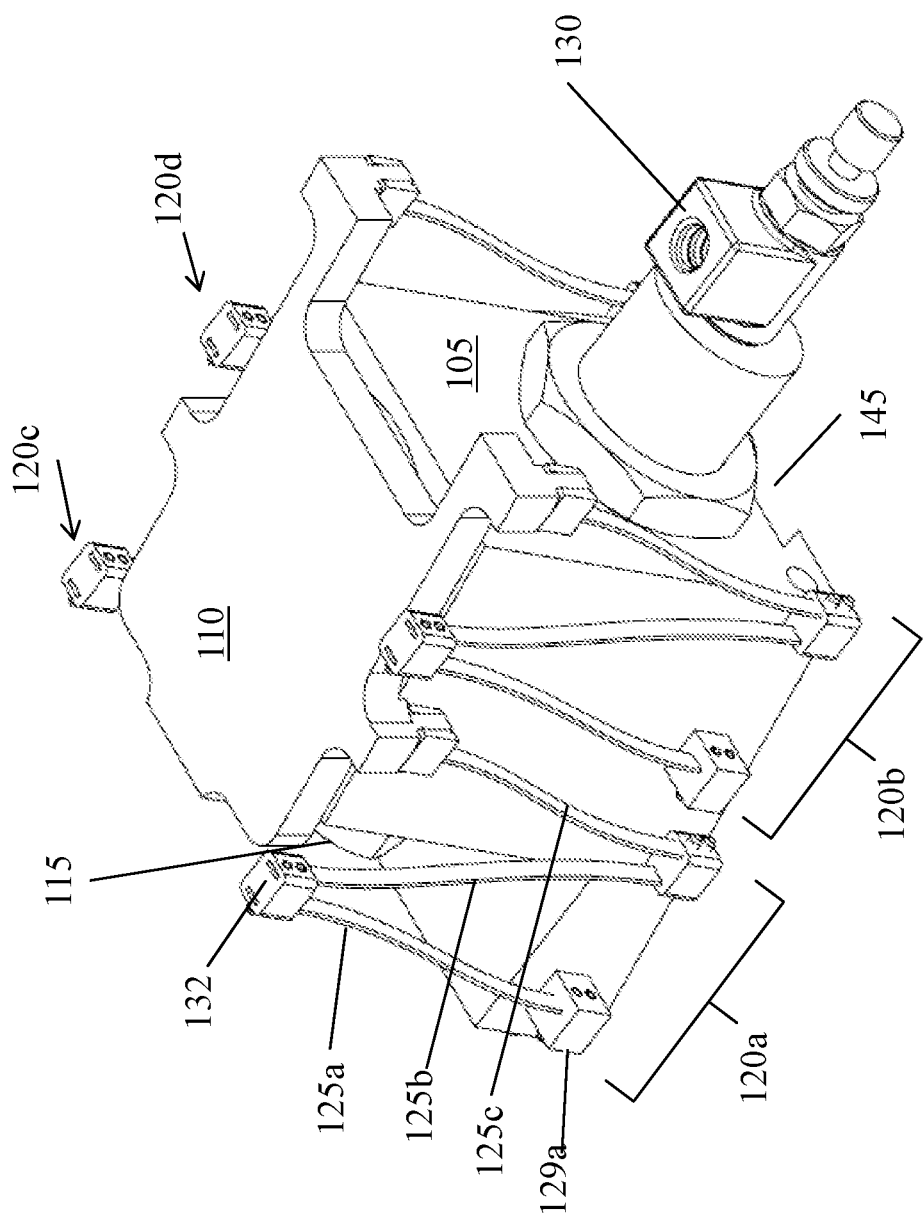
FIGS. 4-7 depict perspective, cross-sectional, side, and top views, respectively, of the exemplary self-sealing container of FIGS. 1-3 in the closed position according to embodiments of the present invention.
Figure 5:
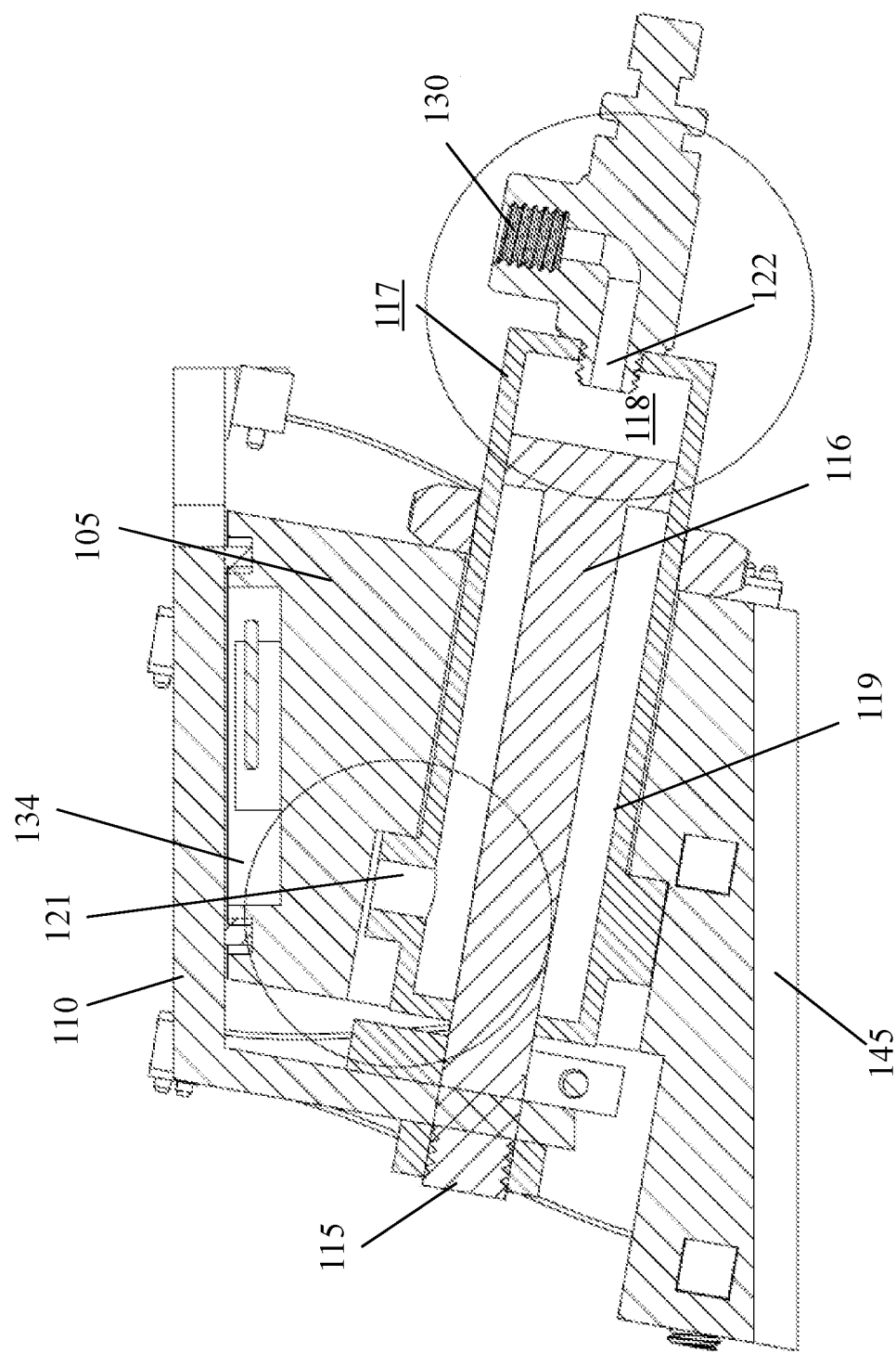
Figure 6:
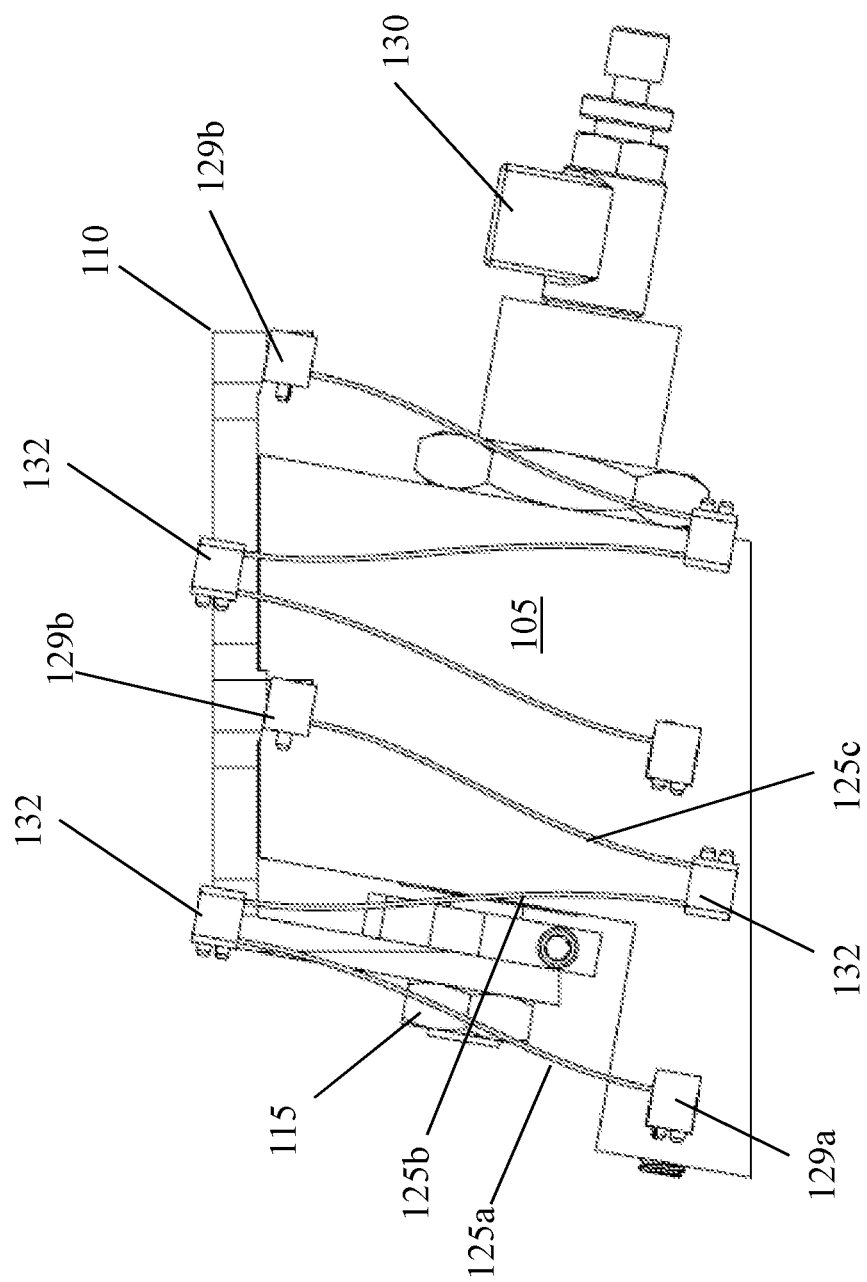
Figure 7:
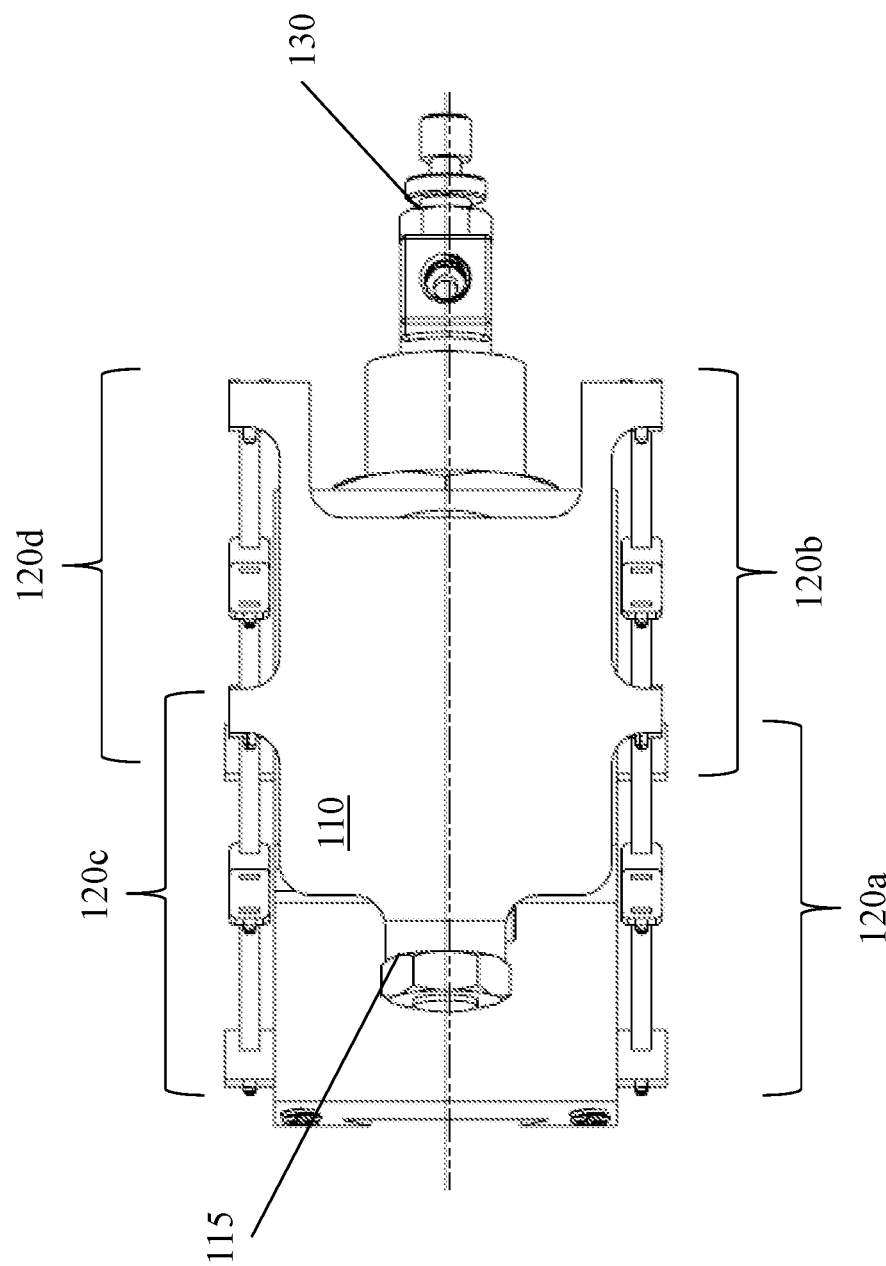

FIGS. 1-3 depict perspective, cross-sectional, and top views, respectively, of an exemplary self-sealing container 100 in the open position according to embodiments of the present invention. The self-sealing container 100 includes a housing 105 with a lid 110. The housing 105 includes a cavity 134 that may be configured with one or more holders 135, 140 for receiving one or more samples. In this embodiment, the holder 135, may receive a TEM grid and/or the holder 140 may receive a SEM pin, though other types of holders for holding other types of samples may be used. A seal 137 is disposed around a perimeter of the cavity 134. When the lid 110 is closed over the housing 105 (as shown and described in more detail below), the seal 137 prevents air from entering the cavity 134 and contacting the one or more samples therein for a certain period of time.

The self-sealing container 100 includes a set of flexure systems 120a, 120b, 120c, 120d (collectively, "120") coupled to the housing 105 and the lid 110. As shown in FIGS. 1-3, the container 100 may have four flexure systems 120, two disposed on one side of the housing 105 and the other two disposed on the opposing side of the housing 105, although two or more flexure systems 120 may be used depending on the application. Each flexure system 120 shown in FIGS. 1-3 has three (3) stages 125a, 125b, 125c (collectively, "125") that are connected in series, although two or more stages may be used. An end of a stage 125a closest to the back of the container 100 is attached to the housing 105. For example, the end may be attached to a mounting block 129a which is coupled to the housing 105, e.g., inserted into a slot (not shown) machined into the housing 105. The mounting block 129a may be secured to the housing 105 by known methods, e.g., using setscrews. The end of the stage 125c closest to the front of the container 100 is attached to the lid 110. The end is attached to another mounting block 129b, which is secured to the housing 105 by known methods. For example, the mounting block 129b may be adhered to a mating feature 131 of the lid 110 using epoxy, such as Torr Seal$^R$, a vacuum-grade epoxy manufactured by Kurt J. Lesker Company of Jefferson Hills, Pa.

The remaining ends of the flexure system 120 are inserted into connectors 132 that create a series connection between two adjacent stages 125. In some embodiments, each end is inserted into a slot in a connector 132. Unlike the mounting blocks 129a and 129b, the connectors 132 are not attached to the container 100. Thus, they enable the stages 125 to extend and retract, subject only to the mounting blocks 129a, 129b that anchor opposite ends of the flexure system 120 to the container 100.

In their relaxed state, the flexure systems 120 collectively draw the lid 110 into the open position. In this state, the lid 110 has been moved horizontally from a closed position to expose a workspace within the cavity 145. Moreover, its vertical movement is small relative to its horizontal movement, thereby enabling the container 100 to retain a low profile. In one embodiment, the flexure system 120 opens the container 100 by elevating the lid 110 by 3.6 mm and retracting it by 20.4 mm.

Referring also to FIGS. 4-7, the container 100 closes when a pneumatic actuator 115, movably coupled to the housing 105 and the lid 110, is actuated by changes in ambient pressure. As the pressure changes, the pneumatic actuator 115 applies increasingly stronger forces to the lid 110, in opposition to the forces from the flexure systems 120. When the pneumatic actuator's 115 forces exceed the flexure systems' 120 forces, the pneumatic actuator 115 overcomes the flexure systems 120 to move the lid 115 horizontally and vertically to the closed position (as depicted in FIGS. 4-7). This movement simultaneously extends the stages 125 of the flexure systems 120, but because the stages 125 are made from a high tensile strength material, the stages 125 can overcome the force from the pneumatic actuator 115.

In this embodiment, the pneumatic actuator 115 is a piston 116 in a double-acting cylinder 117 that responds to differences in pressure. The cylinder 117 extends through the body of the housing 105 at an angle relative to the lid 110 (e.g., 10 degrees, 15 degrees). The cylinder 117 is secured to the housing 105, e.g., with a nut 118, and the piston 116 is secured to a back of the lid 110, e.g., with another nut 119.

The cylinder 117 is divided into front 118 and back 119 sections, and the force exerted on the lid 110 is determined based on the difference in pressures between these two sections. If the pressures are substantially equal, the piston 116 exerts almost zero (0) force. However, as the difference in pressure increases, the piston 116 exerts correspondingly stronger forces on the lid 110.

Pressures within the cylinder 117 can be controlled by ports 121 and 122. The port 121 is fluidly coupled to the back section 119 of the cylinder 117. Because the port 121 remains open, the back section 119 of the cylinder 117 is fluidly connected to the external environment of the container 100 and thus, at any given time, matches ambient pressure. The port 122 is fluidly coupled to the front section 118 of the cylinder 117, and the port 122 is connected to a valve 130 capable of being closed (alternatively, the valve 130 is one-way, and therefore remains closed at all times). The valve 130 may be opened to ambient pressure, when the one or more samples are first loaded into the container 100 (as described in more detail below), and then the valve 130 may be closed and connected to a pump, which can pump the front section 118 of the cylinder 117 to vacuum pressure, thereby closing the lid 110 of the container 100.

When a user first transfers samples to the container 100, the user places the container 100 in a glove box flooded with inert gas. The user opens the valve 130 connected to port 122, and both the front 118 and back 119 sections of the cylinder 117 fill with inert gas. As both sections 118, 119 reach ambient pressure, the net force applied by the pneumatic actuator 115 reaches zero (0). Unopposed, the flexure systems 120 pull the lid 110 open.

The user may secure a sample in the cavity 134 using carbon tape, by way of example. To close the container 100, the user closes the valve 130, attaches a pump (e.g., hand pump, electric pump) to the valve 130, and pumps the front section 118 of the cylinder 117 down to vacuum pressure (e.g., −84 kPa gauge pressure, in one embodiment). As the pressure in the front section 118 of the cylinder 117 drops, the difference in pressures between the front 118 and back 119 sections increases. Consequently, the piston 116 applies increasing larger forces to the lid 110 until the forces exceed the forces exerted by the flexure systems 120. At that point, the piston 116 draws the lid 110 to the closed position, as shown in FIGS. 4-7.

A user then transfers the closed container 100 to the work chamber of a vacuum system, such as an SEM, TEM, or FIB system, and pumps the chamber down to vacuum pressure. Because the open port 121 fluidly couples the back 119 section of the cylinder 117 to the work chamber environment, the back section's 119 pressure drops in tandem. As the pressure of the back section 119 drops so as to approach the low pressure of the front section 118, the piston 116 applies less force to the lid 110. When forces applied by the piston 115 drop below the forces applied by the flexure systems 120, the flexure systems 120 retract and draw the lid 110 into the open position, as shown in FIGS. 1-3.

While the lid 110 is open, the vacuum system may analyze or process the one or more samples. After the user completes this task, the vacuum system flows inert gas into the work chamber. The inert gas floods the cavity 134 and protects the samples, and floods the back section 119 via the port 121. As pressure in the back section 119 changes, the difference between the back section 119 and the front section 118 at vacuum pressure increases, and the piston 116 exerts correspondingly stronger forces on the lid 110. When these forces exceed the forces from the flexure systems 120, the piston 116 draws the lid 110 into the closed position to seal the cavity 134, as shown in FIGS. 4-7.

The user may transfer the closed container 100 to the work chamber of another vacuum system and pump that chamber down to vacuum pressure, and the container 100 will open in response. Flowing inert gas into the chamber after the sample has been studied or processed re-closes the container 100. Thus, the user may repeatedly re-open and re-close the container 100 as the container 100 is transferred to different vacuum systems, while minimizing the sample's exposure to air.

After analysis and/or processing of a sample is complete, the user may return the container 100 to the glove box. Via the open port 121, the back section 119 of the cylinder 119 reaches ambient pressure in the glove box. The user may open the valve 130, thereby returning the front section 118 to ambient pressure. As the pressure of the front section 118 rises so as to approach the ambient pressure of the back section 119, the piston 116 applies less force to the lid 110. When forces applied by the piston 116 drop below the forces applied by the flexure systems 120, the flexure systems 120 retract and draw the lid 110 into the open position. The user may thereafter remove the sample from the container 100.

The Pneumatic Actuator

In various embodiments, the container 100 includes coatings on surfaces of its components. Because air aids in lubrication of metallic components, the container's 100 moving components experience greater friction in vacuum systems, and coatings may help to reduce the friction. Coatings may be applied to the inner surface of the cylinder 117 that is adjacent to the piston 116, as well as the outer surface of the piston 116 adjacent to the cylinder. In some embodiments, the coating may be an oxide layer grown on the cylinder 117 and/or piston 116.

The embodiments depicted in FIGS. 1-7 use a double-acting cylinder for the pneumatic actuator 115. However, so long as the pneumatic actuator 115 is angled relative to the housing 105 and the lid 110 to maintain a low profile for the container 100, any other type of pneumatic actuator 115 may be substituted therein. For example, pneumatic cylinders, bellows, and/or expanding foams or any other material that expands or contracts in response to changes in ambient pressure may be used. Because bellows operate without sliding contact, they are less vulnerable to friction-based degradations in performance under vacuum pressure, compared to pistons.

The Flexure Systems

The container 100 may be scaled to different form factors, to be used in different types of vacuum systems. However, constraining the flexure systems 120 to the requirements of the following formulas should ensure that the flexure systems 120 open the lid 110 to the proper position when the container 100 is at a desired pressure, while withstanding the forces exerted by the pneumatic actuator 115 when the pneumatic actuator 115 closes the lid 110:

$$F = k_f x \tag{1}$$

$$k_f = \frac{12EI}{pl^3} \tag{2}$$

$$M = \frac{Fl}{2} \tag{3}$$

$$\sigma_b = \frac{Mt}{2I} = \frac{Flt}{4I} = \frac{3Ext}{pl^2} \tag{4}$$

Where
F=force at the tip of the flexure system
$k_f$=stiffness of a stage with parallel motion
x=tangential displacement of the tip (i.e., horizontal movement of the tip when fully extended)
E=Young's modulus of the flexure system's material
I=second moment of inertia
l=length (i.e., height) of a stage of a flexure system
p=number of stages in a flexure system
$\sigma_b$=maximum bending stress of a flexure system
t=thickness of a stage in a flexure system Rearrangement of these formulas yields the following relationship between the horizontal distance traveled by the lid and the height of a stage in a flexure system:

$$\frac{xt}{l^2} = \frac{3E}{p\sigma_y}$$

Where $\sigma_y$=yield stress of a flexure system

As the formulas suggest, although the embodiments of FIGS. 1-7 depict flexure systems with three stages, systems may include other numbers of stages. The number may depend upon the materials used to fabricate the flexure systems 120, the amount of horizontal travel required to move a lid 110 between open and closed positions, and the height of the container 100 (and by extension, the minimum height of the stages 125 of the flexure system 120). The formulas (1)-(4) suggest the minimum number of stages 125 needed for a particular container 100, to withstand the oppositional forces from the pneumatic actuator 115.

The embodiments depicted herein include four flexure systems 120, two disposed on one side of the housing 105 and the other two disposed on the opposing side. However, any number of systems 120 may be used. An alternate embodiment may include two flexure systems 120, one on each side of the housing 105. However, any multiple of two may be used, so long as the container 100 has equal numbers of flexure systems 120 on opposing sides of the housing 105.

Figure 8:
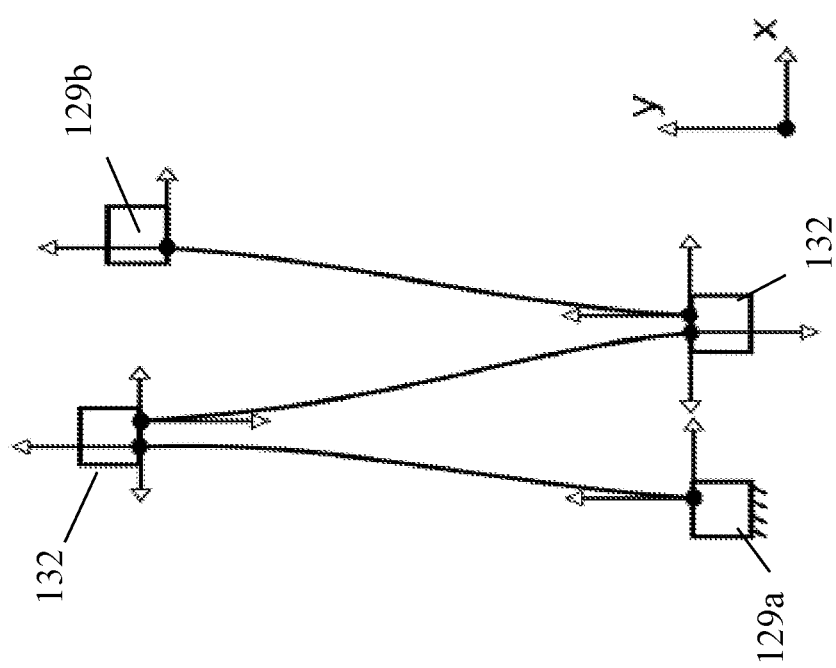
FIGS. 8 and 9 depict representations of the forces that the flexure systems exert on the lid of the self-sealing container according to embodiments of the present invention.
Figure 9:
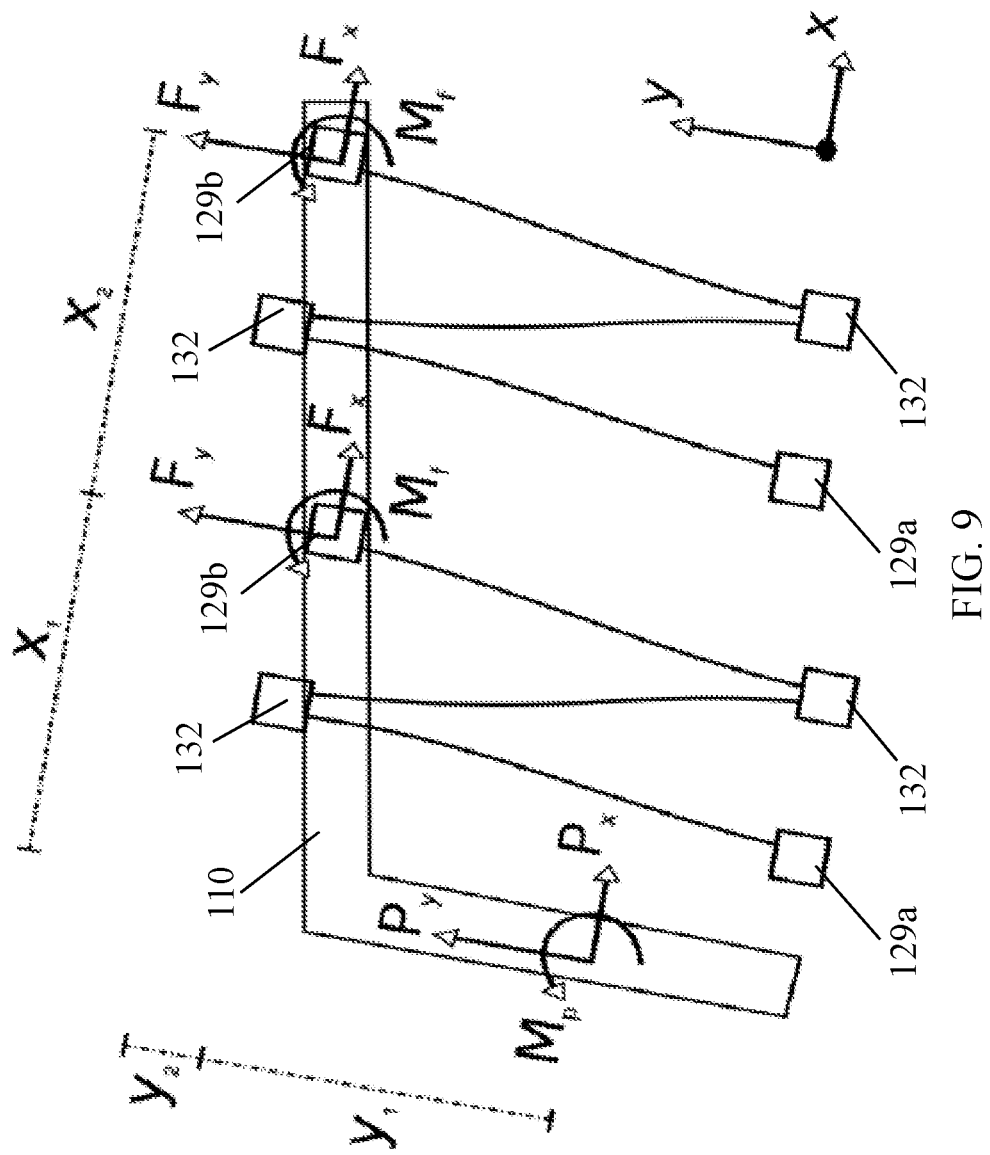

FIGS. 8 and 9 depict simplified flexure systems 120. FIG. 8 depicts a simplified exemplary embodiment of a flexure system 120 composed of three stages 125a, 125b, 125c in series. FIG. 9 depicts another simplified embodiment of flexure systems 120 disposed with the pneumatic cylinder 117 at an angle to the lid 110. This free body diagram models how the forces applied by the flexure systems 120 move the lid 110 in a horizontal direction to expose one or more samples and in a vertical direction to break a sealing force, and how the forces applied by the pneumatic cylinder 117 move the lid 110 in a horizontal direction to conceal one or more samples and in a vertical direction to apply a vertical sealing force. Embodiments with proper angled flexure stage and pneumatic actuator disposal minimize friction in the cylinder 117 and provide the required motion. The force balance equations for this embodiment are:

$$P_x = -4F_x$$

$$P_y = -4F_y$$

$$M_p = 2F_x(y_1 + 2y_2) - 2F_y(x_1 + 2x_2) - M_f$$

Where $P_x$ is the horizontal component of the piston force $P_y$ is the vertical component of the piston force $M_p$ is the moment applied to the piston $F_x$ is the horizontal force applied by one flexure system $F_y$ is the vertical force applied by one flexure system $M_f$ is the moment applied by one flexure system $x_1$ and $y_1$ describe the location of the end of the first flexure stage in FIG. 9

$x_2$ and $y_2$ describe the location of the end of the second flexure stage in FIG. 9.

The stages 125 of the flexure system 120 may be fabricated from any high tensile strength non-ferromagnetic materials. Because the pneumatic actuator 115 extends the flexure systems 120 by the same horizontal distance needed to close the lid 110, the high tensile strength material prevents the flexure systems 120 from breaking under the applied stress. For example, a stage may be formed from titanium, brass, and/or high strength steel alloys, such as stainless spring steel.

In some embodiments, the stages 125 of a flexure system 120 are formed from a single piece of material. For example, the stages 125 may be machined from a piece of titanium or steel alloy, and opposite ends of the resulting flexure system 120 may be attached to the housing 105 and lid 110 using the mounting blocks 129 described above. Alternatively, each stage 125 may include a single strip of material, and the ends of each stage 125 may be inserted into connectors 132 and secured using known methods, e.g., spring-pins, such as depicted in FIGS. 1-7, to form a series of stages 125. Opposite ends of the entire series of stages 125 may be attached to mounting blocks 129, e.g., via spring-pins, which are used to mount the flexure systems 120 onto the container 100, as described above.

In some embodiments, the mounting blocks 129 and/or connectors 132 are fabricated from aluminum. The spring-pins for attaching ends of the flexure system 120 to mounting blocks 129 may be press-fit and made of stainless steel. However, for any of the mounting blocks 129, connectors 132, and spring-pins, any other metals may be used.

The configuration of the flexure systems 120 promotes even contact between the lid 110 and the seal 137. Because the pneumatic actuator 115 is angled relative to the housing 105 and the lid 110, the pneumatic actuator 115 applies a torque to the lid 110. The flexure systems 120 compensate for this torque so that the lid 110 remains level as it contacts the seal 137. As a result, the lid 110 can hermetically seal the samples in the cavity 134.

Advantageously, the flexure systems 120 do not produce particles that may contaminate the vacuum system equipment or the samples. Because the flexure systems 120 simply extend and retract, they do not slide against other components and create fine particles due to abrasive wear. Other types of non-sliding systems, such as linear springs, may be substituted for the flexure systems 120, so long as the alternatives may be configured to exert forces in opposition to those of the pneumatic actuator 115 in the same linear manner.

Other Features of the Container

The container 100 may have a form factor capable of fitting into the working chambers of different vacuum system machines. Thus, the same container 100 may be re-used for SEMs and FIB systems. In some embodiments, the container 100 may have a height less than 41.0 mm, a length less than 60.0 mm, and a width less than 35 mm.

The pneumatic actuator 115 and flexure systems 120 may be disposed at an angle that restrains vertical movement required to open the lid 110 to less than 5.0 mm. When the container 100 is placed in a work chamber, the distance between the top surface of the lid 110 and the lens of the equipment may be 5.0 mm or less. In some embodiments, the pneumatic actuator 115 and flexure systems 120 may be disposed to move the lid 110 about 2.0-3.0 mm vertically, between its open and closed positions. Thus, the lid 110 may remain between about 2.0-3.0 mm below the lens when opened.

The cavity 134 is capable of accommodating one or more sample holders 135, 140 for different types of vacuum system equipment. For example, the cavity 134 may receive a sample stub used with a FIB system, a pin used with a SEM, and/or a grid used with a TEM. Moreover, the sample holders 135, 140 may be inserted into the cavity 134 at depths corresponding to the imaging and processing capabilities of the vacuum system equipment. For example, a sample holder for FIB samples may be positioned so that samples lie less than 8.00 mm under the top surface of the housing 105, so the samples will be accessible by a FIB system. In other examples, the sample holder 135, 140 is positioned so that samples lie within 1.00 mm under the top surface of the housing 105.

The seal 137 may be an o-ring. In some embodiments, the o-ring may be square, which resists torque induced by the lid 110 upon contact with the housing 105. However, any other type of seal 137 capable of hermetically sealing the cavity 134 may be used. When an o-ring is used, the surface of the lid 110 that contacts the o-ring 137 may be polished, thereby increasing the quality of the seal formed between the two components. In some embodiments, vacuum grease may be applied to the o-ring, to achieve the same purpose.

In some embodiments, the valve 130 may be a one-way valve. Thus, when a user pumps down the front section of the pneumatic actuator 115 and closes the valve 130, the front section may remain at vacuum pressure for a designated period of time.

The container 100 may include a flow resistor (not shown) attached to the pneumatic actuator 115, which can advantageously delay the opening of the lid 110. In the embodiments herein, the flow resistor may attach to the port 121 fluidly coupled to the back section 119 of the cylinder 117. When ambient pressure changes, the flow resistor affects the rate of change within the pneumatic actuator 115, i.e., the rate at which pressure within the back section 119 of the cylinder 117 decreases. As a result, when a work chamber is pumped down to vacuum pressure, more time elapses before the forces exerted by the pneumatic actuator 115 sufficiently drop for the flexure systems 120 to open the lid 110.

Without a flow resistor, the flexure systems 120 may begin to open the lid 110 while the work chamber still includes an unacceptable level of air. For example, in one embodiment, the flexure systems 120 may begin opening the lid 110 when ambient pressure has been pumped to 30% of atmospheric pressure. Since the work chamber is still contaminated with air, this preliminary opening may damage certain samples. A flow resistor may delay the opening until the ambient pressure is at an acceptable level of vacuum pressure before the lid 110 of the container 100 opens. Therefore, by using a flow resistor, the lid 110 is more likely to remain closed until the working chamber has been more thoroughly evacuated. In some embodiments, using a flow resistor may delay the opening of the lid 110 by a desired amount of time, such as more than one (1) minute. In some embodiments, the flow resistor is configured to prevent the lid 110 from opening more than two (2) minutes before ambient pressure drops below 50% atmospheric pressure. In further embodiments, the flow resistor delays the lid 110 from opening until the ambient pressure drops below 0.1% of atmospheric pressure.

In some embodiments, the container 100 includes electrical contacts in the cavity 134. These contacts may terminate on a surface of the cavity 134, such that the sample holder, e.g., TEM sample holder 135 or SEM sample holder 140, may be electrically connected to the vacuum system or an external electrical connection. For example, the sample holders 135, 140 may include guides for receiving the samples that ensure that the samples' electrical contacts connect and electrically communicate with the container's 110 electrical contacts. Furthermore, the container 100 may be connected to equipment to supply power to its electrical contacts and by extension, the sample. This feature enables the user to perform an in situ experiment on one or more air sensitive samples in a vacuum system, while observing the sample with a SEM, TEM, and/or FIB system within the vacuum environment.

Figure 10:
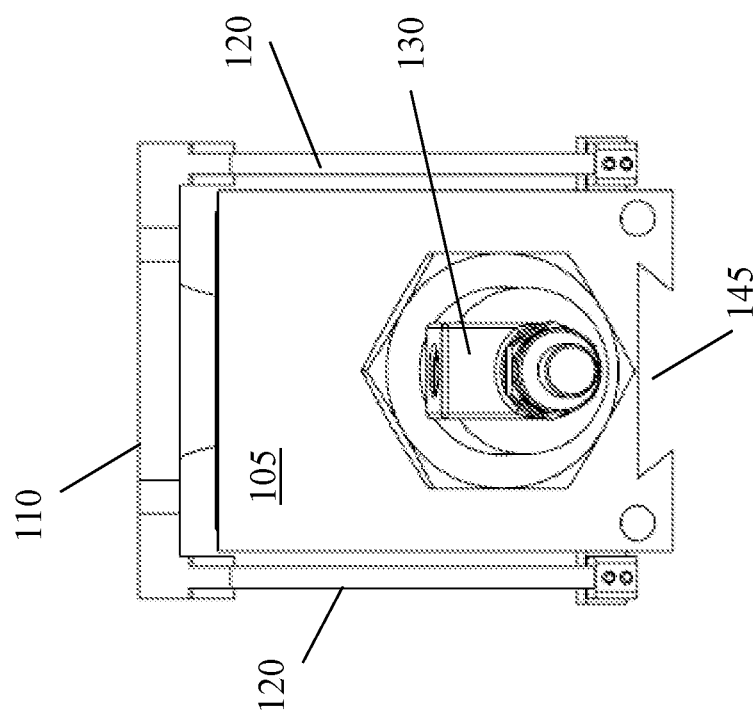
FIG. 10 depicts a front view of the self-sealing container according to embodiments of the present invention.
Figure 11:
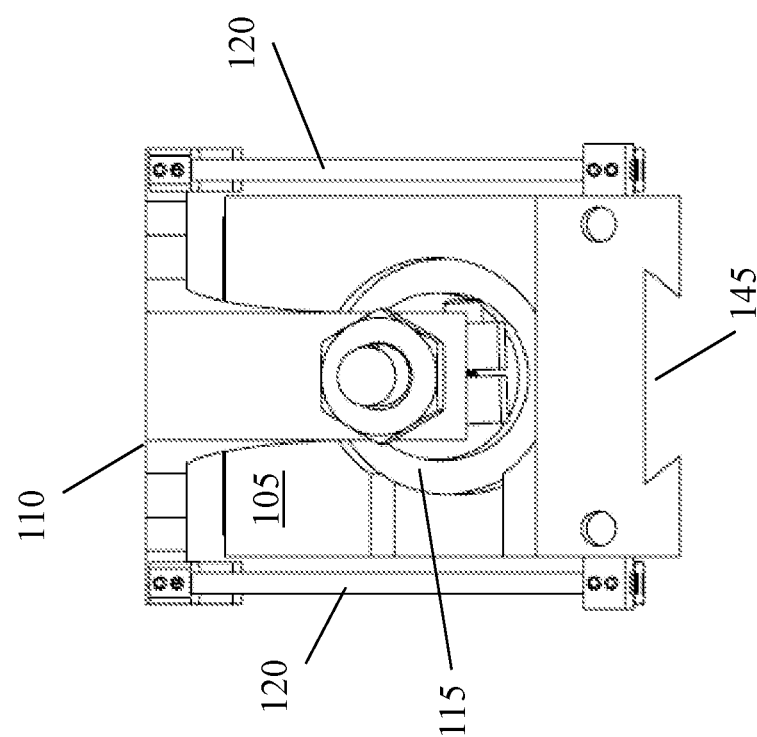
FIG. 11 depicts a back view of the self-sealing container according to embodiments of the present invention.
Figure 12:
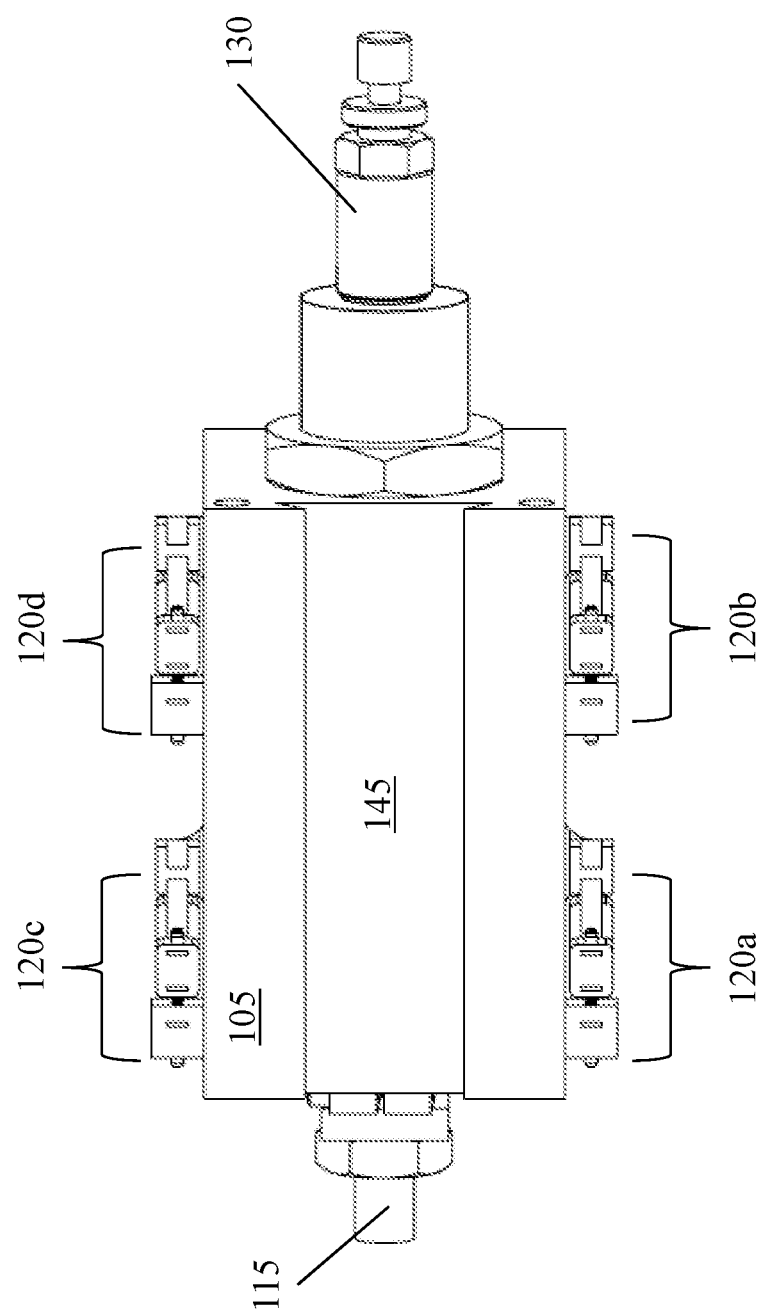
FIG. 12 depicts a bottom view of the self-sealing container according to embodiments of the present invention.

FIGS. 10-12, which depicted front, back, and bottom views of the container 100, show a dovetail socket 145 capable of anchoring the container 100 in a vacuum system with a corresponding dovetail stub. Other embodiments may use fittings that interface with other types of sample holders in the vacuum system. Furthermore, in some embodiments, different types of fittings may be removably attached to the container 100 so that the container 100 may be used across multiple vacuum systems platforms. Thus, a user may attach a fitting for one type of SEM, and then exchange it for a fitting for a FIB system.

In many embodiments, the components in the container 100 are formed from non-ferromagnetic materials. Because imaging equipment such as SEMs and FIB systems may be adversely affected or damaged by magnetic particles, a container 100 composed of non-ferromagnetic materials may be advantageous. Thus, the samples remain stable while being analyzed or processed. For example, the housing 105 may be composed of aluminum, an easily machined material. In fact, computer numerical control (CNC) may be used to machine the housing 105 out of a piece of aluminum. Moreover, the aluminum components may be coated to prevent the aluminum from absorbing moisture or oxygen from air during storage, which might later contaminate samples inserted into the container 100. In some embodiments, the aluminum components are coated via anodizing.

An Exemplary Container, According to the Embodiments of the Invention

In one embodiment, the container 100 may include a lid 110 that travels 20.4 mm horizontally and 3.6 mm vertically between its open and closed positions. The pneumatic actuator 115 may be a double-acting cylinder disposed at a ten (10) degree angle relative to the housing 105. The piston 116 may have a 12.4 mm diameter bore and when actuated, provides 12.5 N of force with 1.0 atm pressure across the piston 116. Each flexure system 120 may be designed to fully extend to 20.4 mm, and in this state, the flexure systems 120 collectively provide 8.0 N of force. Thus, as a work chamber is pumped down to vacuum pressure, the flexure systems 120 do not beginning drawing the lid 110 open until the piston's 116 applied forces drop below 8.0 N.

To fit in a SEM and FIB, to give one example, the container 100 may be less than 50.0 mm high, 100.0 mm long, and 75.0 m wide. The piston 116 described above, angled at ten (10) degrees, permits horizontal extension of the flexure systems 120 by 20.4 mm, and the material available for stages 125 may be titanium (E=114 GPa, $\sigma_b$=830 MPa), in strips that are 0.406 mm thick and 2.0 mm wide. One embodiment that operates, remaining within the constraints of formulas (1)-(4) described above, uses three stages per flexure system 120, where each stage is 38.8 mm long. If the container 100 used only two stages 125, the stages 125 would break when extended by the pneumatic actuator 115.

Performance of One Embodiment of the Container

Figure 13:
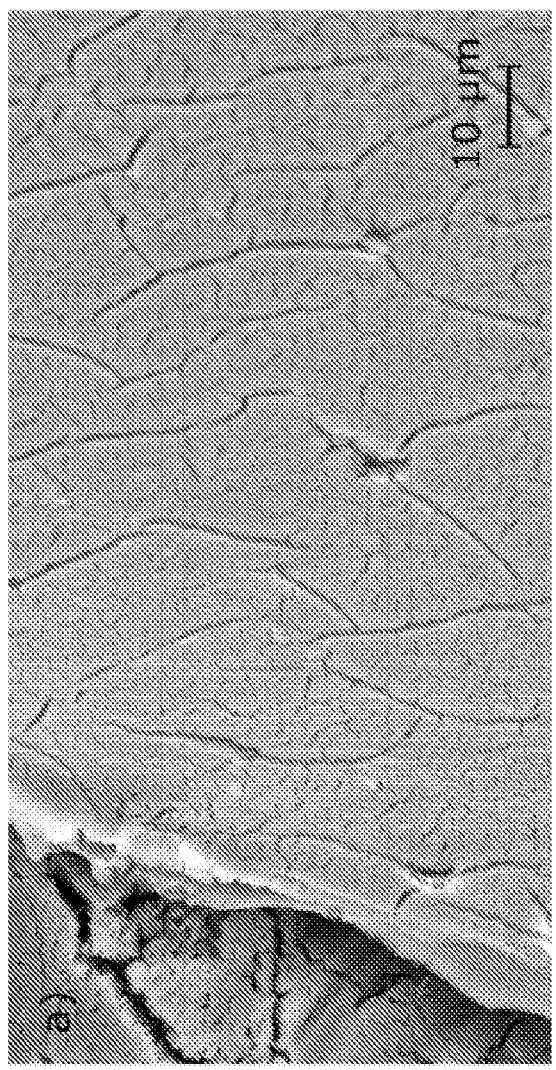
FIGS. 13-15 depict SEM images of samples of $Li_3PS_4$ when exposed to air, transferred via a self-sealing container according to embodiments of the present invention to an SEM for imaging, and stored within the self-sealing container for 10 hours, respectively.
Figure 14:
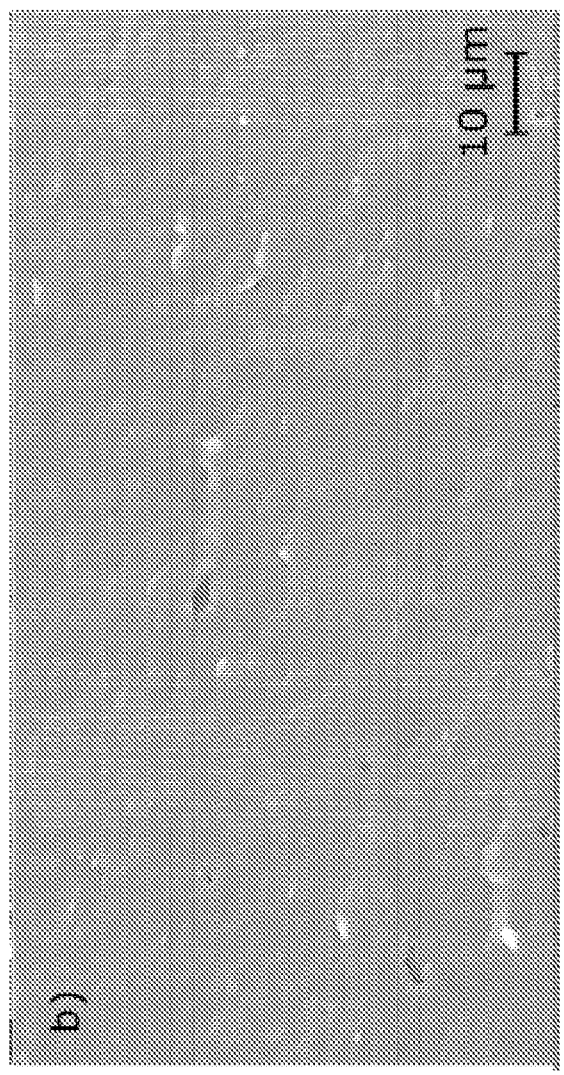
Figure 15:
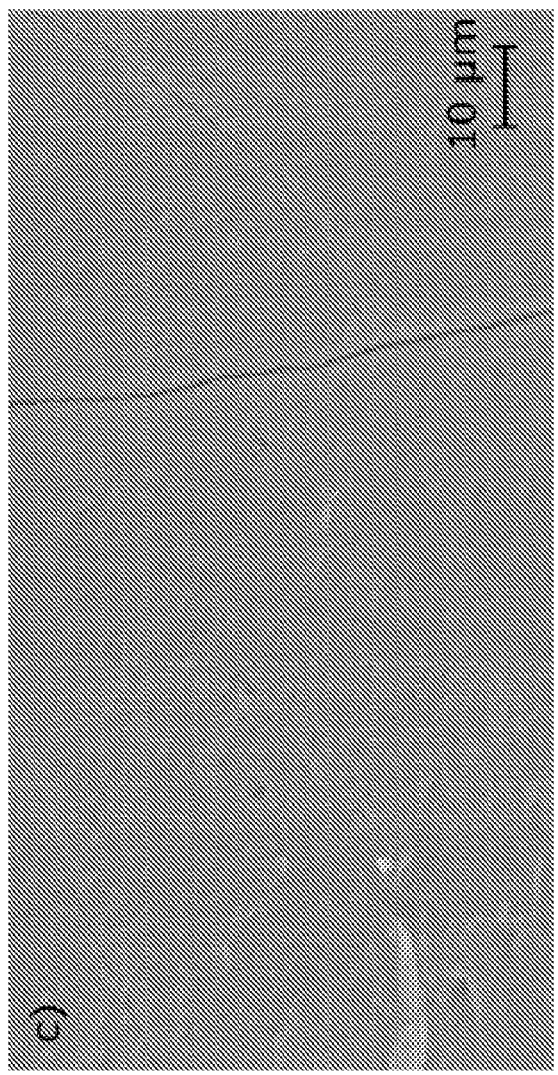

In three tests performed by the inventors, samples of a lithium ionic conductor $Li_3PS_4$ were exposed to air, sealed in a container 100 and transported to an SEM within 10 minutes, and stored in the container 100 for 10 hours. As shown in FIG. 13, a sample exposed to air develops surface cracks within a matter of seconds. However, FIG. 14 demonstrates that a sample sealed in a container 100 which is opened within an SEM for analysis does not experience this degradation. Furthermore, because the lid 110 and seal 137 can hermetically seal the cavity 134, the container 100 experiences little leakage. Even after 10 hours of storage in the container 100, examination of the sample by an SEM reveals little air-induced degradation, as shown in FIG. 15.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A self-sealing container for use in transferring one or more air sensitive samples into and out of a vacuum system, the container comprising:
   a housing comprising a cavity configured to receive the one or more samples;
   a lid, disposed on top of the housing, that is configured to interface with the housing to form a seal capable of sealing the one or more samples in the cavity when the lid is in a closed position;

two or more flexure systems, each flexure system coupled to the housing and the lid, one of the flexure systems is disposed on one side of the housing and the other flexure system is disposed on an opposing side of the housing, the flexure systems configured to apply forces to the lid that move the lid horizontally and vertically above the housing, into an open position; and a pneumatic actuator actuated by a change in ambient pressure, movably coupled to the housing and the lid, that is configured to apply forces to the lid, when the pneumatic actuator is actuated, that move the lid horizontally and vertically from the open position to the closed position, in opposition to and in excess of the forces applied by the flexure systems.

2. The self-sealing container of claim 1, wherein the pneumatic actuator is positioned at an angle relative to the lid.

3. The self-sealing container of claim 2, wherein the pneumatic actuator is positioned at a ten (10) degree angle relative to the lid.

4. The self-sealing container of claim 1, wherein each flexure system includes at least two stages.

5. The self-sealing container of claim 4, wherein each flexure system is formed from a single piece of material.

6. The self-sealing container of claim 4, wherein each stage comprises a strip of material coupled to one other stage in series.

7. The self-sealing container of claim 1, wherein one end of a first stage is attached to the housing and one end of a second stage is attached to the lid.

8. The self-sealing container of claim 1, wherein each stage of a flexure system includes a strip of material comprising titanium, brass, a steel alloy, or combinations thereof.

9. The self-sealing container of claim 1, wherein the pneumatic actuator is a double-acting cylinder having a piston movable within the cylinder, the cylinder coupled to the housing and the piston movably coupled to the lid.

10. The self-sealing container of claim 9, further comprising a valve in one end of the cylinder, wherein the valve is configured to connect to a pump that actuates the piston by drawing air out of the one end to form a vacuum therein.

11. The self-sealing container of claim 9, wherein the pneumatic actuator is actuated when a difference in the pressure on one side of the piston compared to the pressure on the other side of the piston within the cylinder reaches a predetermined value.

12. The self-sealing container of claim 9, further comprising coatings on surfaces of the cylinder and the piston that contact one another, to reduce friction.

13. The self-sealing container of claim 1, wherein the pneumatic actuator is a bellows.

14. The self-sealing container of claim 1, wherein the pneumatic actuator is expanding foam.

15. The self-sealing container of claim 1, further comprising a flow resistor coupled to the pneumatic actuator and configured to affect a rate of change in the pressure within the pneumatic actuator in order to delay movement of the lid to the open position by the flexure systems.

16. The self-sealing container of claim 1, further comprising a square o-ring that is disposed around a perimeter of the cavity and configured to form the seal between the lid and the housing.

17. The self-sealing container of claim 1, wherein the container includes four flexure systems, each flexure system includes three (3) stages in series, two of the flexure systems are disposed on one side of the housing, and the other two flexure systems are disposed on an opposing side of the housing.

18. The self-sealing container of claim 1, further comprising electrical contacts disposed in the cavity, the electrical contacts in electrical communication with the one or more samples.

19. The self-sealing container of claim 1, wherein the housing includes aluminum and an inner surface of the cavity includes an anodized coating.

20. A method of transferring an air-sensitive sample into and out of a vacuum system, the method comprising:
providing a container having a cavity in a housing, the cavity configured to receive a sample, a lid disposed on the housing, the lid having an open position and a closed position and configured to seal the sample in the cavity when the lid is in the closed position and is spring-biased in the open position and a piston assembly
configured with a first side thereof coupled to ambient pressure and a second side thereof coupled to a valved port, wherein the piston assembly
includes a piston coupled to the lid and configured to move the lid to the closed position when net forces on both sides of the piston owing to pressure differences are sufficient to overcome the spring bias and to retain the lid in the closed position;
placing the container in a glove box flooded with inert gas and with the valved port open, whereupon ambient pressure exists on the first and second sides of the piston assembly so that the pressures are approximately equal and the spring-biased lid is in the open position;
placing the sample in the cavity;
coupling a pump to the valved port, running the pump to bring down pressure on the second side of the piston assembly to a desired level of vacuum, and closing the valved port, so that the lid is retained in the closed position;
moving the container into a chamber of the vacuum system;
evacuating the chamber of the vacuum system, whereupon the ambient pressure on the first side of the piston assembly drops to match the vacuum pressure on the second side of the piston assembly and the pressures are approximately equal and the spring-biased lid is in the open position, so that the sample can be analyzed by the vacuum system;
after analyzing the sample, flooding the chamber of the vacuum system with inert gas, whereupon ambient pressure on the first side of the piston assembly is increased and the pressure difference between the first and second sides of the piston assembly is again sufficient to overcome the spring bias and to retain the lid in the closed position; and
removing the sample from the chamber of the vacuum system.

21. A container comprising:
a cavity in a housing, the cavity configured to receive a sample;
a lid disposed on the housing, the lid having an open position and a closed position and configured to seal the sample in the cavity when the lid is in the closed position and is spring-biased in the open position; and
a piston assembly
configured with a first side thereof coupled to ambient pressure and a second side thereof coupled to a valved port, wherein the piston assembly includes a piston coupled to the lid and configured to move the lid to the closed position when net forces on both sides of the piston owing to pressure differences are sufficient to overcome the spring bias and to retain the lid in the closed position.

* * * * *